(12) United States Patent
Birkbeck

(10) Patent No.: US 7,452,456 B2
(45) Date of Patent: Nov. 18, 2008

(54) RECREATIONAL SPAS, SANITIZATION APPARATUS FOR WATER TREATMENT, AND RELATED METHODS

(75) Inventor: Paul Birkbeck, Lakewood, CO (US)

(73) Assignee: Pioneer H2O Technologies, Inc., Lakewood, CO (US)

( * ) Notice: Subject to any disclaimer, the term of this patent is extended or adjusted under 35 U.S.C. 154(b) by 889 days.

(21) Appl. No.: 11/000,499

(22) Filed: Dec. 1, 2004

(65) Prior Publication Data

US 2006/0113256 A1  Jun. 1, 2006

Related U.S. Application Data

(60) Provisional application No. 60/631,571, filed on Nov. 30, 2004.

(51) Int. Cl.
*C02F 1/46* (2006.01)
*C25B 1/00* (2006.01)

(52) U.S. Cl. .................... 205/701; 205/742; 205/758; 205/759; 205/760; 205/619; 204/242; 204/275.1; 204/276

(58) Field of Classification Search ................ 205/701, 205/742, 619, 758, 759, 760; 204/242, 275.1, 204/276

See application file for complete search history.

(56) References Cited

U.S. PATENT DOCUMENTS

| | | | |
|---|---|---|---|
| 4,502,928 A * | 3/1985 | Umetani et al. | ............. 205/345 |
| 5,676,805 A | 10/1997 | Silveri | |
| 5,752,282 A | 5/1998 | Silveri | |
| 5,759,384 A | 6/1998 | Silveri | |
| 5,885,426 A | 3/1999 | Silveri | |
| 6,007,693 A | 12/1999 | Silveri | |
| 6,238,555 B1 | 5/2001 | Silveri et al. | |
| 6,270,680 B1 | 8/2001 | Silveri | |
| 6,811,747 B2 | 11/2004 | Silveri | |
| 7,351,331 B2 * | 4/2008 | Birkbeck | ................ 210/167.11 |

* cited by examiner

*Primary Examiner*—Arun S Phasge
(74) *Attorney, Agent, or Firm*—Berenato, White & Stavish

(57) ABSTRACT

A water sanitization apparatus is provided. The apparatus includes a power unit, a housing with inlet and outlet openings for permitting the passage of water containing a bromide salt into the housing and water containing a free bromine and a sanitizing metal ion out of the housing, respectively, and first and second electrodes electrically connected to the power unit. The first electrode has a graphite or carbon substrate doped with copper, silver, and/or zinc. When operated as an anode, the first electrode converts bromide salt to free bromine and oxidize doped metal to sanitizing metal ion. Also provided are related water treatment systems and methods.

27 Claims, 3 Drawing Sheets

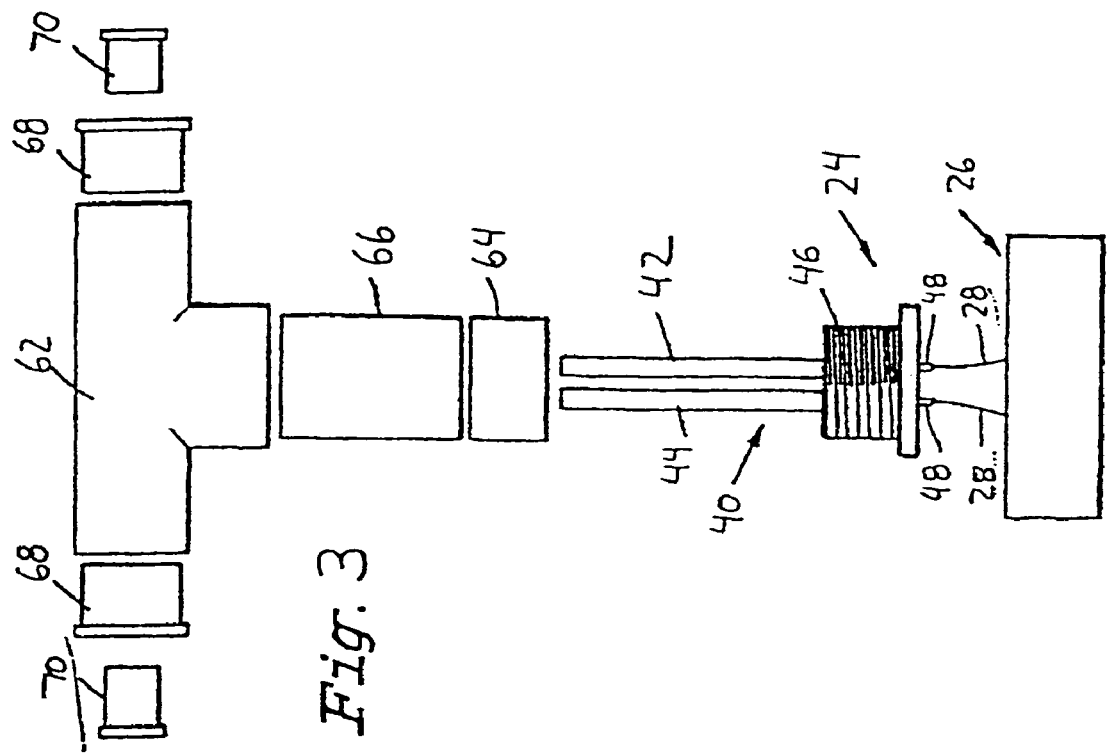
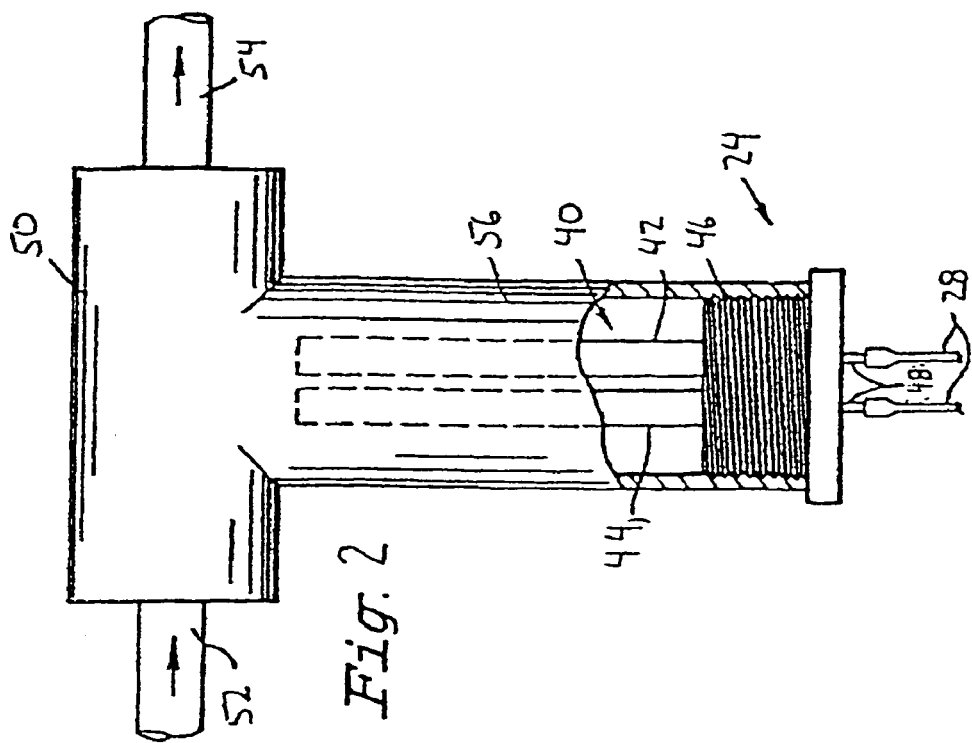

RECREATIONAL SPAS, SANITIZATION APPARATUS FOR WATER TREATMENT, AND RELATED METHODS

CROSS-REFERENCE TO RELATED APPLICATION

This application claims the benefit of priority of provisional application 60/631,571 entitled "Recreational Spas, Sanitization Apparatus for Water Treatment, and Related Methods" filed on Nov. 30, 2004, the complete disclosure of which is incorporated herein by reference.

BACKGROUND OF THE INVENTION

1. Field of the Invention

The invention relates to an apparatus for sanitation of hot tubs, spas and swim spas. The invention also is related to systems containing a sanitization apparatus, and methods of treating water, especially in recreational water reservoirs having recirculating systems.

2. Description of the Related Art

Recreational water reservoirs such as hot tubs, spas, and swim spas (hereinafter collectively referred to as "recreational spa water reservoirs") are breading grounds for algae, bacteria and other microorganisms. If left untreated, waterborne bacteria can afflict users of the recreational spa water reservoirs with a variety of health problems and illnesses, such as pseudomonas, rashes, hot tub lung, ear infections, etc.

Sanitation of recreational reservoir water is well known and long practiced. Sanitation regimens and processes rely on standard halogen treatment chemicals to provide disinfecting action. Halogens, and in particular free chlorine and bromine, long have been the chemicals of choice for treating recreational reservoir water. During the past 20 years, chlorine and bromine have proved to be useful and cost effective for ensuring proper sanitation of pools and spas.

Conventional halogen sanitation regimens and processes for recreational spa water reservoirs make use of tablets, liquids and powders that rely on a strict and continual maintenance regimen in order to function properly. Deviation due to forgetfulness or negligence can lower the availability of sanitizing halogen in the water reservoir and, as a consequence, compromise the fitness of the water. It is not uncommon, for example, for a spa (hot tub) owner to remove a floating apparatus containing brominating tablets from a spa prior to use, and then forget to return the apparatus to the spa after use. A day or more of missed sanitizing treatment can be sufficient to permit proliferation of microorganisms in the spa. Microorganism build-up in the water eventually affects water clarity. However, microorganism levels can reach a harmful level before becoming visually detectable. In the event that a spa user decides the visual water clarity to be acceptable and enters the spa, the user may unsuspectingly be exposed to harmful levels of organisms.

Another drawback to conventional halogen tablets and some other solids is that the tablets are prone to disintegration upon extended use, resulting in the buildup of total dissolved solids (TDS) in the water reservoir. TDS can generate large amounts of foam in water, requiring the user to treat the water with chemicals such as de-foamers and de-scummers and to routinely drain the water.

More recently, it has been known to equip swimming pools with "automatic" chlorine generator cells. These automatic cells usually cooperate with an already existing re-circulation system, such as a water filtration system comprising piping and a water pump. Ordinary salt, such as sodium chloride, is added to the water reservoir to form a dissolved electrolyte in the water. The water carries the electrolyte through the piping and, consequently, through the cell installed in the re-circulation system. Electrodes in the cell cause the salt to undergo electrolysis, which breaks the salt down into its basic elements, e.g., sodium and chlorine. The re-circulation system returns the water to the water reservoir with an enhanced chlorine level to provide sanitation and disinfecting action against bacteria, viruses, and algae. In doing so, the chlorine reverts back into its dissolved salt state for recycling and further use. This cycle is repeated multiple times.

Known chlorinator cells work to the extent that they satisfactorily treat water. However, known cells have drawbacks. These metallic cells, and in particular the electrodes of these cells, have a limited lifespan and are thus both inconvenient and expensive to maintain in full working order.

SUMMARY OF THE INVENTION

Accordingly, it is an object of the invention to provide a sanitization apparatus and related water treatment systems and methods that are acceptable for use in recreational hot tubs, spas, and water spas (hereinafter collectively "recreational spas").

Another object of the invention is to provide a sanitization apparatus and related water treatment systems and methods that release a combination of bromine and sanitizing metal ions into a water reservoir with synergistic sanitizing results.

It is another object of the invention to provide a sanitization apparatus and related water treatment systems and methods that significantly lessen or eliminate problems such as destruction and corrosion of recreational spa equipment.

Still a further object of the invention is to provide a sanitization apparatus and related water treatment systems and methods that can be easily adopted into the filter lines of existing automatic recirculating water systems for automated operation.

To achieve one or more of the foregoing objects, and in accordance with the purposes of the invention as embodied and broadly described herein, according to a first aspect of this invention there is provided a recreational spa, comprising a recreational spa water reservoir for receiving a halide salt dissolved in water, a recirculating system for removing the water from and returning the water to the spa water reservoir, a power unit, a housing, and first and second electrodes electrically connected to the power unit. The recirculating system comprises a passageway. The housing comprises inlet and outlet openings operatively associated with the passageway for permitting the passage of water containing the bromide salt into the housing and water containing free bromine and sanitizing metal ions out of the housing, respectively. The first and second electrodes respectively have first and second contact regions in the housing for contacting water passing through the housing. The first contact region comprises a substrate selected from graphite and carbon, the substrate doped with a metal selected from copper, silver, and zinc. The first electrode is operable as an anode for converting the bromide salt to the free bromine and oxidizing the metal to the sanitizing metal ions.

In accordance with a second aspect of the invention, a method is provided for treating recreational spas using the water treatment system of the first aspect of the invention. According to this aspect of the invention, the method comprises passing water containing the bromide salt from the spa water reservoir into the housing through the inlet opening, generating free bromine and sanitizing metal ions at the first contact region, and discharging through the outlet opening and returning water containing the free bromine and the metal ions to the spa water reservoir.

According to a third aspect of this invention there is provided a water sanitization apparatus, comprising a power unit, a housing, and first and second electrodes electrically connected to the power unit. The housing comprises an inlet opening for permitting the passage of water containing bromide salt into the housing and an outlet opening for permitting the passage of water containing free bromine and sanitizing metal ions out of the housing. The first and second electrodes respectively have first and second contact regions in the housing for contacting water passing through the housing. The first contact region comprises a substrate selected from graphite and carbon, the substrate doped with a metal selected from copper, silver, and zinc. The first electrode is operable as an anode for converting the bromide salt to the free bromine and oxidizing the metal to the sanitizing metal ions.

According to a fourth aspect of the invention, a method is provided for sanitizing water using the water sanitization apparatus of the third aspect of the invention. According to this aspect of the invention, the method comprises passing bromide salt-containing water into the housing through the inlet opening, generating free bromine and the sanitizing metal ions at one of the electrodes, and discharging water containing the free bromine and the sanitizing metal ions from the housing through the outlet opening.

BRIEF DESCRIPTION OF THE DRAWINGS

The accompanying drawings are incorporated in and constitute a part of the specification. The drawings, together with the general description given above and the detailed description of the preferred embodiments and methods given below, serve to explain the principles of the invention. In such drawings:

FIG. 2 is a partial cut-away, partial phantom sectional view of a sanitization apparatus according to an embodiment of the invention, said apparatus being installable into the system of FIG. 1;

FIG. 3 is an exploded schematic view of an alternative sanitization apparatus according to another embodiment of the invention, the apparatus being installable into the system of FIG. 1.

DETAILED DESCRIPTION OF PREFERRED EMBODIMENTS AND METHODS OF THE INVENTION

Figure 1:
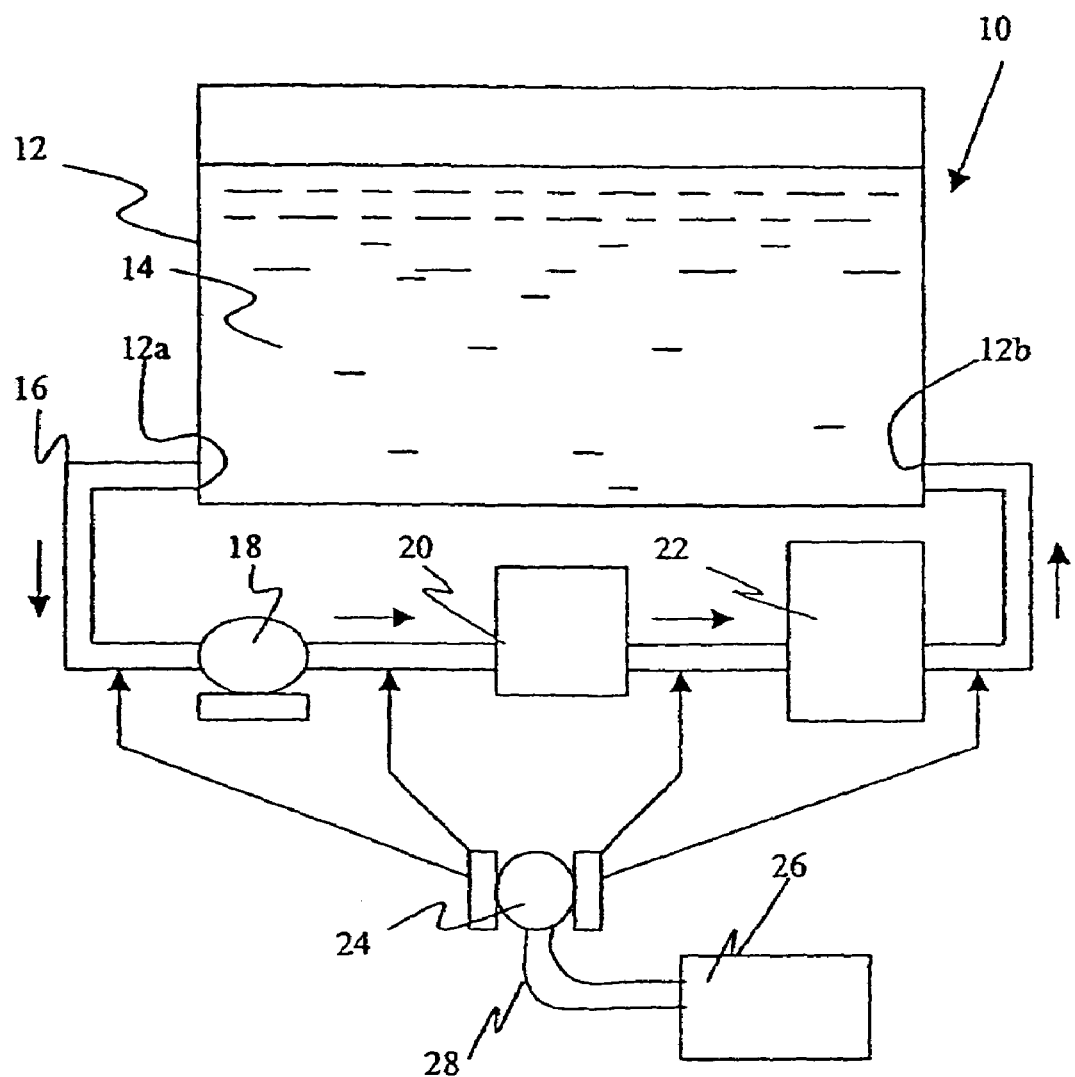
FIG. 1 is a schematic view of a water treatment system equipped with a sanitization apparatus according to an embodiment of the invention.

Reference will now be made in detail to the presently preferred embodiments and embodied methods of the invention as illustrated in the accompanying drawings, in which like reference characters designate like or corresponding parts throughout the drawings. It should be noted, however, that the invention in its broader aspects is not limited to the specific details, representative apparatuses and methods, and illustrative examples shown and described in this section in connection with the preferred embodiments and methods. The invention according to its various aspects is particularly pointed out and distinctly claimed in the attached claims read in view of this specification, and appropriate equivalents.

It is to be noted that, as used in the specification and the appended claims, the singular forms "a," "an," and "the" include plural referents unless the context clearly dictates otherwise.

Referring now more particularly to the drawings, a water treatment system 10 for the purification of water in accordance with an embodiment of the invention is illustrated. The system 10 comprises a body of water 14 disposed in a water reservoir 12. According to a preferred embodiment, water reservoir 12 comprises a recreational, portable spa (or hot tub or water spa) having a capacity less than 1000 gallons, typically about 150 gallons to about 700 gallons of water. The terms spa and hot tub are used interchangeably herein.

It is to be understood that water reservoir 12 may comprise recreational bodies other than spa water reservoir 12, such as and especially including swimming pools. Water reservoir 12 is preferably but not necessarily a man-made stationary or movable vessel. It also should be understood that various aspects and embodiments of the invention may have wider applicability, such as to purification or sanitization of other bodies of water, air conditioning and cooling towers, industrial waste, other industrial uses.

Water treatment system 10 is particularly preferred for use in connection with a reservoir 12 having one or more pre-existing recirculation systems. For example, in the illustrated embodiment, which is especially suited for use in a spa, the recirculation system comprises a flow conduit (e.g., piping or passageway) 16 communicating at its opposite ends with an inlet 12a and outlet 12b of water reservoir 12. The pre-existing circulation system of the illustrated embodiment further comprises a pump 18 and a filter 20 (preferably a mechanical filter) situated along flow conduit 16. In certain systems, such as for a hot tub, the recirculation system may further comprise a heater 22 for heating water 14 in reservoir 12 to a selected temperature and maintaining the temperature.

In FIG. 1, reference numeral 24 represents the sanitization apparatus according to an embodiment of the invention. Sanitization apparatus 24 is, in use, preferably connected in series to a filtration recirculation system so that filtered (or pre-filtered) water will pass through apparatus 24 before returning to reservoir 12 through outlet 12b. For example, sanitization apparatus 24 may be situated before (upstream from) pump 18, between the pump 18 and filter 20, between filter 20 and heater 22, or after (downstream from) heater 22. Optionally, a plurality of sanitization apparatuses 24 may be placed in line at different locations along the recirculation system. In the event that system 10 comprises a plurality of recirculation systems, a respective sanitization apparatus 24 may be installed in line with one, multiple, or each of the recirculation systems.

Figure 4:
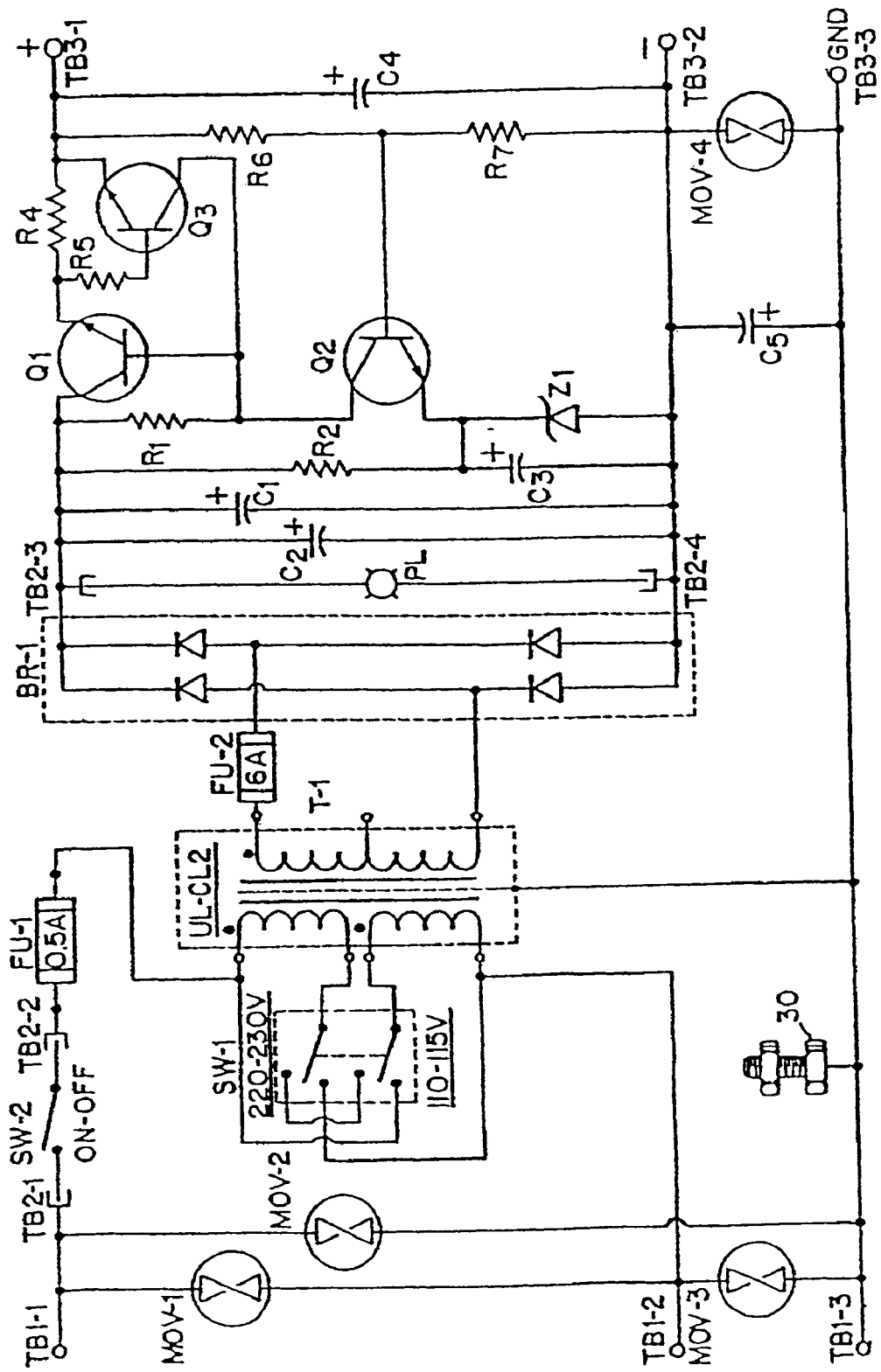
FIG. 4 is a circuit diagram of a suitable AC to DC power supply that may be used to stimulate the electrodes of the present invention.

Electrical connectors 28, e.g., wires, electrically connect sanitization apparatus 24 to a power unit 26. Power unit 26 can be of any known or useful design that is capable of receiving either a standard household 110 or 220 volt alternating current (AC) source and is capable of converting the AC power source to direct current (DC) power. Power unit 26 may comprise an AC to DC rectifier and controller for converting the normal household current to the required direct current (DC) output. Power unit 26 is preferably capable of supplying a nominal charge of about 650 millivolts DC at about 100 to 500 milliamps, more preferably about 250 to 350 milliamps to an electrode assembly 40 (discussed below) through connectors 28. A schematic circuit diagram of a suitable AC to DC power supply is illustrated at FIG. 4. It should be noted that this particular power supply 12 has numerous grounding features, as illustrated in FIG. 4, to provide an increased level of safety during operation. Power unit 26 is preferably digital in design, i.e., operates under digital (duty cycle) control.

The system may further comprise a timer (not shown) employed with a polarity reversal circuit to periodically change the anode and cathode potential to prevent scale buildup on the electrode surfaces. The polarity is preferably changed every 3 to 8 minutes, more preferably every 4 minutes of operation.

Electrode assembly 40 of the illustrated embodiment comprises a pair of electrodes 42 and 44 in spaced parallel relationship with each other. An end cap 46 secures one end of each of electrodes 42 and 44 in this manner. Electrodes 42 and 44 are fitted into the inner diameter of cap 46 and are cemented using a non-conductive epoxy. Any of the numerous commercially available epoxies that are also not chemically reactive or water soluble can be used for this purpose.

End cap 46 permits easy installation and removal of electrode assembly 40 into and from existing filter lines or water recirculation systems. Cap 46 can be constructed of various materials, but preferably is made of ABS, PVC or stainless steel and likewise preferably is threaded so as to provide assistance in securing it to recirculation systems or filter lines as illustrated in FIG. 2.

Electrodes 42 and 44 are furthermore each tapped and fitted with a respective stainless steel threaded bolt 48. As previously indicated, electrodes 42 and 44 are provided with low voltage DC current from power unit 26 through connectors 28 and bolts 48. Bolts 48 protrude through cap 46 so that an electrical contact from power supply 26 may be made through connectors 28.

Electrodes 42 and 44 of this embodiment of the present invention are now discussed in greater detail. The length, width and thickness of electrodes 42 and 44 may vary with the number of gallons of water to be purified in a given application. A preferable electrode configuration is illustrated in FIGS. 2 and 3. As an example, electrodes that measure 8" in length, 1" in width and have a thickness of approximately 0.5" (inch) may be useful in connection with the purification of small bodies of water (between 1,000 and 50,000 gallons).

In a preferred embodiment of the invention, electrode 42 comprises a first contact region comprising a substrate selected from graphite and carbon, the substrate doped (that is impregnated) with a metal selected from copper, silver, and zinc. The impregnation may constitute, for example, about 10 weight percent or less of the electrode, e.g., about 3 weight percent to about 10 weight percent. As referred to herein, an electrode "contact region" may comprise a portion (i.e., less than all of the electrode) or the entire electrode.

An example of a useful high density copper impregnated graphite with a micro grain structure that may serve as electrode 42 is EC-15C modified to contain about 10 weight percent copper. The EC-15C is commercially available from of MWI, Inc. of Dallas, Tex., and is copper impregnated via vacuum deposition. The EC-15C has a bulk density of 2.79 g/cm$^3$, a specific resistance of 230 μohm-cm, a flexural strength of 10.953 psi, a shore hardness of 67, and an average grain size of 7 microns.

Also in a preferred embodiment, electrode 44 comprises a contact region constructed of a substrate selected from graphite and carbon, more preferably non-woven extruded carbon graphite that is highly conductive, and is still more preferably totally non-reactive when operated under normal parameters. For example, the contact region of electrode 44 is preferably free of metal doping, especially copper, silver, and zinc metal doping. As referred to herein, an electrode "contact region" may comprise a portion (i.e., less than all of the electrode) or the entire electrode. The contact region preferably consists essentially of, and optionally consists of graphite.

The non-woven extruded carbon graphite of electrode 44 preferably has a permeability equal to or less of 0.14 darcy's and a porosity equal to or less than 21%. More preferably, the non-woven extruded carbon graphite of electrode 44 has a permeability equal to or than 0.01 darcy's and a porosity equal to or less than 15%. Still more preferably, the non-woven extruded graphite has a permeability equal to or less than 0.005 darcy's and a porosity equal to or less than 13%. Non-woven extruded graphite materials having low permeabilities and porosities generally are much more durable and long lasting in an electrically active aqueous environment that other materials previously used for such purposes, such as compressed carbon composite and platinum coated metals. Without wishing to be bound by any theory, water absorption by the carbon graphite substrate generally increases with porosity. The application of an electrical current to a highly porous electrode can cause the liberation of a relatively large amount of hydrogen and oxygen gases in the pores. The gases generally expand and, as the gases attempt to escape the porous structure, can degrade the electrode.

Another preferred yet optional characteristic of the non-woven extruded carbon graphite of electrode 44 is a relatively low ash content. Preferably, the ash content is not greater than about 5 weight percent, more preferably not greater than about 1 weight percent, still more preferably not greater than 0.5 weight percent, and most preferably less than 0.2 weight percent. Again without wishing to be bound by theory, higher ash contents can adversely affect conductivity and lead to erosion of electrode 44, thereby shortening the electrode lifespan.

Examples of useful materials for electrode 44 are listed in Table 1 below, and include grades YBD, YBDX, YBDXX, YBDXX 88, and YBDXX 158, each of which is commercially available from UCAR Carbon Company, Inc. of Clarksburg, W.V.

TABLE 1

|  | YBD | YBDX | YBDXX | YBDXX88 | YBDXX158 |
| --- | --- | --- | --- | --- | --- |
| Bulk Density (g/cm$^3$) | 1.50 | 1.57 | 1.65 | 1.68 | 1.73 |
| Particle Size (max. in) | 0.03 | 0.03 | 0.03 | 0.03 | 0.03 |
| Flexural Strength (psi) | 2600 | 3300 | 3400 | 3500 | 4100 |
| Young's Modulus (10$^6$) | 2.0 | 2.1 | 2.1 | 2.2 | 2.4 |
| Tensile Strength (psi) | 2000 | 2100 | 2200 | 2500 | 3400 |
| Compressive Strength (psi) | 6600 | 10400 | 15800 | 18000 | 22500 |
| Permeability (darcy's) | 0.14 | 0.01 | 0.005 | 0.006 | 0.0 |
| Porosity (%) | 21 | 15 | 13 | 10 | 5 |
| Hardness (Rockwell) | 78 "L" | 91 "L" | 90 "L" | 110 "L" | 121 "L" |

TABLE 1-continued

|  | YBD | YBDX | YBDXX | YBDXX88 | YBDXX158 |
|---|---|---|---|---|---|
| C.T.E. ($10^{-6}/°$ C.) |  | 2.5 | 3.7 | 3.8 | 5.1 |
| Thermal Conductivity (W/mK) | 7* | 7 | 4.1 | 4 | 4 |
| Ash (%) | 0.2 | 0.2 | * | * | * |

* = Estimate; All properties measured "with grain".

Of these, YBDXX 88 and YBDXX 158 are impregnated (or "doped") with a phenolic resin, which increases the resistivity of the materials. The selected non-woven extruded graphite of embodiments of this invention preferably yet optionally is substantially free of impregnated resins, or at least are doped with a sufficiently small amount of resin so as not to lower conductivity below operable levels. The aqueous specific surface resistivity of the electrodes is preferably equal to or less than $10^{-2}$ (0.01) ohms/cm$^2$, more preferably equal to or less than $10^{-3}$ (0.001) ohms/cm$^2$. The aqueous specific resistivity may be higher; higher resistivities may be accounted for by use of enhanced electrolyte concentrations, greater available applied voltages, and/or closer electrode spacing.

Properties such as bulk density, particle size, strength (flexural, tensile, and compressive), Young's Modulus, and hardness are not particularly limited, other than being adequate for the intended purpose of the invention. Suitable but not necessarily limiting ranges for each of these properties may be deduced from the exemplary graphitic materials reported in the above Table 1.

In operation apparatus 24 essentially functions as an electrolytic device (or electrochemical cell) which uses a source of electric potential to pass electric current through two electrodes immersed in a solution of salt. Electrode assembly 40 is first inserted into a contact chamber of housing 50. Electrode assembly 40 can be secured to housing 50 by cementing the cap 46 to portion of the inner surface of housing 50 and/or by providing a threaded outer surface on the cap 46 that engages a threaded surface inside of housing 50. Housing 50 is installed in the return line of a water flow or recirculation system. Electrode assembly 40 is connected to power supply 26 as previously described in detail.

Water 14 from water reservoir 12 circulating through the recirculating system is supplied to the contact chamber of housing 50 by water supply line 52, which is coupled to (or constituted by) flow conduit 16. The water flowing into housing 50 comes into contact with electrode assembly 40 for bromine and sanitizing metal ion enrichment. Water supply line 52 is smaller in diameter than the contact chamber in order to slow down the flow of water through housing 50 and promote a longer contact time of the water with electrode assembly 40. Accordingly, it is preferred that water supply line 52 is on the order of 1.5" to 2" in diameter, while the contact chamber is 2" to 4" in diameter. It should be understood that these dimensions may vary, for example, depending upon the flow rate and type of water purification to be achieved, as well as the size of reservoir 12 and apparatus 24.

The "T-shaped" geometry of the contact chamber with its vertical chamber 56 is preferred yet optional, and serves to promote a longer contact time between water and electrodes 42 and 44. With electrodes 42 and 44 placed in a vertical chamber 56 of housing 50, low voltage DC current is passed between electrodes 42 and 44. The electrolyte comprises a bromide salt, such as NaBr (sodium bromide) dissolved in water. Bromide ions in the water coming into contact with one of electrodes 42 or 44 operating as the anode, i.e., positive charged electrode, are converted into corresponding free available bromine. The chemistry is as follows:

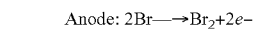

Anode: 2Br—→Br$_2$+2$e$-

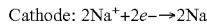

Cathode: 2Na$^+$+2$e$-—→2Na

When metal-doped electrode 42 functions as the anode, sanitizing metal (e.g., copper) ions are released from electrode 42 and enter the solution. The sanitizing metal ions released into the electrolyte preferably are discharged with the electrolyte through the outlet opening into the spa water reservoir. Eventually, the sanitizing metal ions are recycled into the housing through the inlet opening, where the ions in solution gain electrons at the cathode and plate electrode 44 functioning as the cathode. (It should be understood that a portion of the sanitizing metal ions released at the anode may plate at the cathode without first passing into the spa water reservoir.) The reactions at the cathode and anode for copper are as follows:

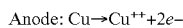

Anode: Cu→Cu$^{++}$+2$e$-

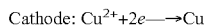

Cathode: Cu$^{2+}$+2$e$-—→Cu

Reversing the polarity of electrode assembly 40, so that metal-doped electrode 42 operates as the cathode and non-doped electrode 44 operates as the anode, will caused any metal plated on electrode 44 to enter into solution. Eventually, the metal ions make their way (directly or indirectly through the water reservoir) to electrode 42 operating as cathode and plate on electrode 42.

Electronic control of power unit 26 increases or decreases the power to the electrodes for the purpose of increasing or decreasing bromine and sanitizing metal ion production. Other parameters affecting bromine and sanitizing metal ion production include electrolyte concentration and spacing of the electrodes from one another. For example, water 14 in reservoir 12 has a suitable electrolyte salt content in order for the electrolysis to take place to release sufficient free available bromine into the flowing water to provide adequate purification. The electrolyte salt concentration may be selected, for example, in a range of 1,500 to 2,500 ppm (parts per million).

Outflow liquid 14 from the device and having an enhanced free bromine level and sanitizing metal ion level dissolved therein is directed back to reservoir 12 through line 54, which is likewise of smaller diameter than housing 50 in order to promote longer contact time of the water in the chamber with electrodes 42 and 44. The bromine and sanitizing metal ion contents of water 14 in reservoir 12 are thereby increased to provide a sanitizing and disinfecting action. In this manner, the illustrated embodiment of the present invention provides for the sanitization of water in a recirculation system that utilizes standard household current and requires only a low voltage DC current to be converted from the alternating current power supply. The free bromine produced when consumed during sanitation reverts back to its salt counterpart and the cycle repeats. The sanitizing metal ions are returned to housing 50 and plates on the electrode 42, 44 operating as the cathode.

Referring now to FIG. 3, utilization of device 24 is illustrated in connection with a standard tee type fitting 60 found in many existing recirculating water lines. Device 24, operating in the same manner as described in detail above, can be connected to such a tee fitting 62 with the use of an adaptor 64 and pipe 66 made preferably of PVC or a similar material. The pipe 66 serves as the housing of the electrode assembly. In addition, restrictions on the water flow both into and out of tee fitting 62 can be accomplished by the use of one or more reducers, such as reducers 68 and 70.

Apparatus 24 may be operated on any time schedule sufficient for maintaining water 14 in reservoir 12 sanitized. The operation schedule will depend upon various factors, including the size of the water reservoir, environment conditions, personal preference, etc. According to one preferred yet optional embodiment, water is circulated through the circulating system and the apparatus for at least 6 to 12 hours per day, typically as dictated by a timer associated with pump 18. The timer optionally may be controlled to split the operational period into multiple shifts spaced uniformly or non-uniformly throughout the course of day. Unit 26 is electrically connected to the load side of circulating pump 18 to operate in synchronicity with the pump.

The proper operation of apparatus 24 may be tested with bromine and copper test strips or a standard liquid reagent that will show the actual bromine and/or copper levels in the reservoir's water.

Operation of the embodied apparatus 24 and system 10 of the present invention may provide various advantages. For example, routine and consistent use of the apparatus 24 in accordance with the above-prescribed schedule can substantially reduce or eliminate the need to use chemicals and to drain reservoir 14 of water 12 due to poor water clarity or other problems discussed above. Another advantage is that the generated bromine is converted back into it counterpart salt after performing its sanitizing function, thereby reducing or eliminating the need to introduce new salt into the system. Additionally, the combination of bromine and sanitizing metal ions provides a synergistic cleaning mechanism that effectively treats microorganisms such as bacteria and algae.

The embodied apparatus 24 advantageously may be operated with little maintenance. For example, reversing polarity on a frequent basis regulates plate build-up on the electrodes, thereby reducing the need for manual cleaning of the electrodes. Further, embodiments of the present invention advantageously allow for prolonged operation of the electrode assembly 40 without replacement of the electrodes 42 and 44.

The following experiments are presented by way of example, and are not necessarily limiting on or exhaustive of the scope of the invention.

EXPERIMENTS

Tests were performed in an exhaust fume hood at 24° C. and ambient pressure. Initially 2.0 liters of ASTM Type II water were placed in a vessel and stirred. To this solution, 4.4 grams of Genesis Tru-Blu reagent (99% Technical grade NaBr; BioLab Commercial Division, Ga, USA) were added to reach the desired concentration of 2200 mg/L NaBr. After the reagent dissolved, this concentration was verified in duplicate using Environmental Test Systems Inc. sodium bromide test strips (Lot #3721211). This analysis was performed at both a 1× and 2× dilution.

Following the initial preparation of the solution, a bromine generator comprising a GENESIS Synergy electronic controller and SYNERGY Electrode Cell of Pioneer H2O Technologies, Inc. of Lakewood, Colo. was placed in the vessel and the system was allowed to equilibrate with the power off for five minutes. After equilibrium, the absence of free bromine and copper ions was verified using both the colorimetric and test strip methods. The bromine generator was turned on at a power setting of 10 for the first group of tests (Table 2), and sample aliquots for bromine and copper ion analysis were taken at 1-minute intervals.

Bromine levels exceeding the limit of the calorimeter analysis were determined using the test strip method (Lot #235/Orthotolidine/3.75% Hydrochloric acid; Lot #253 pH Reagent):

TABLE 2

| Minute | Test Strip Concentration | 0.1% Orthotolidine (OTO) |
| --- | --- | --- |
| 0 | <3 mg/L | N/D |
| 1 | <6 mg/L | >3.5 mg/L |
| 2 | >10 mg/L | >6.5 mg/L |
| 3 | >20 mg/L | 15 mg/L* |

*Diluted to 0.50 concentration for measurement

The bench scale results were extrapolated as follows. At a power setting of 10, after three minutes (0.05 hours) the solution contained 15 mg/L of bromine in 2.0 liters, constituting 30 mg of total bromine formed in 0.05 hours. This is equivalent to 600 mg bromine per hour, and 14.4 grams bromine per day.

Further extrapolating this data, at a power setting of 10, the following bromine concentrations were determined for various size water reservoirs:

TABLE 3

300 gallons (1136 L): 14400 mg/1136 L = 12.7 mg/L = 12.7 ppm $Br_2$/day
400 gallons (1514 L): 14400 mg/1514 L = 9.5 mg/L = 9.4 ppm $Br_2$/day
500 gallons (1892 L): 14400 mg/1892 L = 7.8 mg/L = 7.5 ppm $Br_2$/day
600 gallons (2279 L): 14400 mg/2279 L = 6.2 mg/L = 6.3 ppm $Br_2$/day
700 gallons (2653 L): 14400 mg/2653 L = 5.4 mg/L = 5.4 ppm $Br_2$/day
800 gallons (3032 L): 14400 mg/3032 L = 4.7 mg/L = 4.7 ppm $Br_2$/day Copper ion levels exceeding the limit of the colorimeter analysis were determined using a test strip method (LaMotte—Lot #4054):

TABLE 4

| Minute | Test Strip Concentration |
| --- | --- |
| 0 | 0 mg/L |
| 1 | <0.3 mg/L |
| 2 | >0.3 mg/L |
| 3 | 0.6 mg/L |

The bench scale results were extrapolated as follows. At a power setting of 10, after three minutes (0.05 hours) the solution contained 0.6 mg/L of bromine in 2.0 liters, constituting 1.2 mg of total copper ions formed in 0.05 hours. This is equivalent to 24 mg copper ions per hour, and 0.576 grams bromine per day.

Further extrapolating this data, at a power setting of 10, the following copper ion concentrations were determined for various size water reservoirs:

TABLE 5

400 gallons (1514 L): 576 mg/1514 L = 0.38 mg/L = 0.38 ppm $Cu^{++}$/day
500 gallons (1892 L): 576 mg/1892 L = 0.30 mg/L = 0.30 ppm $Cu^{++}$/day
600 gallons (2279 L): 576 mg/2279 L = 0.25 mg/L = 0.25 ppm $Cu^{++}$/day
700 gallons (2653 L): 576 mg/2653 L = 0.22 mg/L = 0.22 ppm $Cu^{++}$/day
800 gallons (3032 L): 576 mg/3032 L = 0.19 mg/L = 0.19 ppm $Cu^{++}$/day The foregoing detailed description of the preferred embodiments of the invention has been provided for the purpose of explaining the principles of the invention and its practical application, thereby enabling others skilled in the art to understand the invention for various embodiments and with various modifications as are suited to the particular use contemplated. This description is not intended to be exhaustive or to limit the invention to the precise embodiments disclosed. Modifications and equivalents will be apparent to practitioners skilled in this art and are encompassed within the spirit and scope of the appended claims.

What is claimed is:

1. A recreational spa, comprising:
   a recreational spa water reservoir for receiving a halide salt dissolved in water;
   a recirculating system for removing the water from and returning the water to the spa water reservoir, the recirculating system comprising a passageway;
   a power unit;
   a housing comprising inlet and outlet openings operatively associated with the passageway for permitting the passage of water containing the bromide salt into the housing and water containing free bromine and sanitizing metal ions out of the housing, respectively; and
   first and second electrodes electrically connected to the power unit and respectively having first and second contact regions in the housing for contacting water passing through the housing, the first contact region comprising a substrate selected from graphite and carbon, the substrate doped with a metal selected from copper, silver, and zinc, the first electrode being operable as an anode for converting the bromide salt to the free bromine and oxidizing the metal to the sanitizing metal ions.

2. A recreational spa according to claim 1, wherein the second contact region comprises a member selected from a graphite substrate and a carbon substrate, and wherein the second contact region is free of metal doping.

3. A recreational spa according to claim 1, wherein the first contact region is doped with copper.

4. A recreational spa according to claim 1, wherein the first contact region is doped with copper and a metal selected from silver and zinc.

5. A recreational spa according to claim 1, wherein the power unit permits switching polarity between the first and second electrodes.

6. A recreational spa according to claim 1, wherein the spa has a capacity of from about 150 to about 700 gallons.

7. A recreational spa according to claim 1, wherein the recirculating system further comprises a circulation pump and a filter.

8. A recreational spa according to claim 1, wherein the substrate is doped to about 10 weight percent metal.

9. A method of treating a spa, comprising:
   providing the spa of claim 1;
   passing water containing the bromide salt from the spa water reservoir into the housing through the inlet opening;
   generating free bromine and sanitizing metal ions at the first contact region; and
   discharging through the outlet opening and returning water containing the free bromine and the metal ions to the spa water reservoir.

10. A method according to claim 9, wherein the second contact region comprises a member selected from a graphite substrate and a carbon substrate, and wherein the second contact region is free of metal doping.

11. A method according to claim 9, wherein the first contact region is doped with copper.

12. A method according to claim 9, wherein the first contact region is doped with copper and a metal selected from silver and zinc.

13. A method according to claim 9, further comprising switching polarity between the first and second electrodes.

14. A method according to claim 9, wherein the spa has a capacity of from about 150 to about 700 gallons.

15. A method according to claim 9, wherein the substrate is doped to about 10 weight percent metal.

16. A water sanitization apparatus, comprising:
   a power unit;
   a housing comprising an inlet opening constructed and arranged for permitting the passage of water containing a bromide salt into the housing and an outlet opening constructed and arranged for permitting the passage of water containing free bromine and sanitizing metal ions out of the housing; and
   first and second electrodes electrically connected to the power unit and respectively having first and second contact regions in the housing for contacting water passing through the housing, the first contact region comprising a substrate selected from graphite and carbon, the substrate doped with a metal selected from copper, silver, and zinc, the first electrode being operable as an anode for converting the bromide salt to the free bromine and oxidizing the metal to the sanitizing metal ions.

17. A water sanitization apparatus according to claim 16, wherein the second contact region comprises a member selected from a graphite substrate and a carbon substrate, and wherein the second contact region is free of metal doping.

18. A water sanitization apparatus according to claim 16, wherein the first contact region is doped with copper.

19. A water sanitization apparatus according to claim 16, wherein the first contact region is doped with copper and a metal selected from silver and zinc.

20. A water sanitization apparatus according to claim 16, wherein the power unit permits switching polarity between the first and second electrodes.

21. A water sanitization apparatus according to claim 16, wherein the substrate is doped to about 10 weight percent metal.

22. A method of sanitizing water, comprising:
   providing the water sanitization apparatus of claim 16;
   passing bromide salt-containing water into the housing through the inlet opening;
   generating free bromine and the sanitizing metal ions at one of the electrodes; and
   discharging water containing the free bromine and the sanitizing metal ions from the housing through the outlet opening.

23. A method according to claim 22, wherein the second contact region comprises a member selected from a graphite substrate and a carbon substrate, and wherein the second contact region is free of metal doping.

24. A method according to claim 22, wherein the first contact region is doped with copper.

25. A method according to claim 22, wherein the first contact region is doped with copper and a metal selected from silver and zinc.

26. A method according to claim 22, further comprising switching polarity between the first and second electrodes.

27. A method according to claim 22, wherein the substrate is doped to about 10 weight percent metal.

* * * * *